Feb. 14, 1939.  A. H. R. FEDDEN ET AL  2,147,336
AIR SCREW FOR AIRCRAFT
Filed April 14, 1938  2 Sheets-Sheet 1

Inventors
A. H. R. Fedden
H. L. Milner
by Wilkinson & Mawhinney
Attorneys.

UNITED STATES PATENT OFFICE 2,147,336

AIR SCREW FOR AIRCRAFT

Alfred Hubert Roy Fedden and Harry Lawley Milner, Bristol, England, assignors to Rotol Airscrews Limited, Gloucester, England, a British company Application April 14, 1938, Serial No. 202,056 In Great Britain April 22, 1937

4 Claims. (Cl. 170—173)

This invention is for improvements in air screws for aircraft and relates to the attchment of the blades to the hub.

Where the blade is of a comparatively soft material such as magnesium alloy the root of the blade has to be reinforced by a surrounding sleeve or cap of harder material such as steel. The stress between these two parts tends to cause fretting between them. The object of this invention is to prevent such fretting.

According to one feature of the invention the internal diameter of the surrounding sleeve is outwardly tapered at its outer end to receive a tapered bush between the sleeve and the blade-root, the angles of the said tapers being so small that, after having been forced in under high pressure, the bush is retained by friction against withdrawal.

According to another feature of the invention, the angle of taper of the bush is slightly greater than the angle of taper of the space between the sleeve and the blade-root so that, as the bush is forced in, the sleeve is expanded to a greater extent at its outer end than elsewhere.

According to another feature of the invention a method of removing the bush consists in forcing fluid under high pressure into the interior of the sleeve. In this way the sleeve is expanded whereby the bush can be withdrawn.

A specific embodiment of the invention will now be described by way of example with reference to the accompanying drawings, in which.

Figure 1:
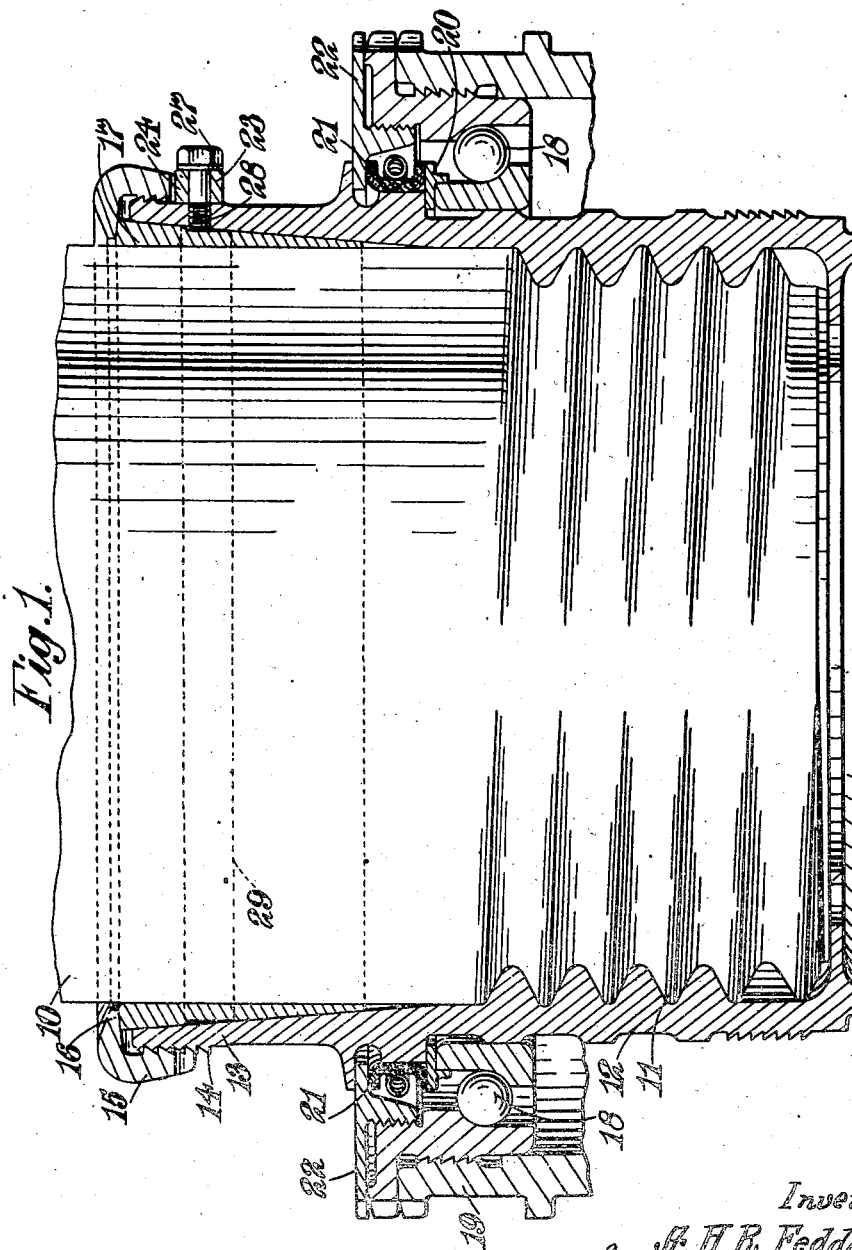
Figure 1 is an elevation of the root portion of an air screw blade showing, in section, the reinforcing sleeve and other associated parts.

As shown in the drawings, the air screw blade 10 which is of magnesium alloy or aluminum alloy or other comparatively soft metal, is formed at its root end with screw-threads 11 of rounded V form. Co-operating screw-threads are formed on the interior of a steel sleeve 12 which is screwed on to the blade-root, but is not shrunk on. The sleeve 12 is formed with a long outwardly-extending socket members 13 having external buttress threads 14 for engagement by a nut 15. The nut has an inwardly-directed flange 16 to engage the outer end of a bush 17 which is wedged-shaped in a direction longitudinally of the blade-axis.

The sleeve 12 engages an inner thrust bearing (not shown) and an outer ball bearing 18 which is supported in a socket portion 19 of the air screw hub. Sealing means 20, 21, 22, are provided for preventing the escape of lubricant from the bearings surrounding the sleeve 12.

Figure 2:
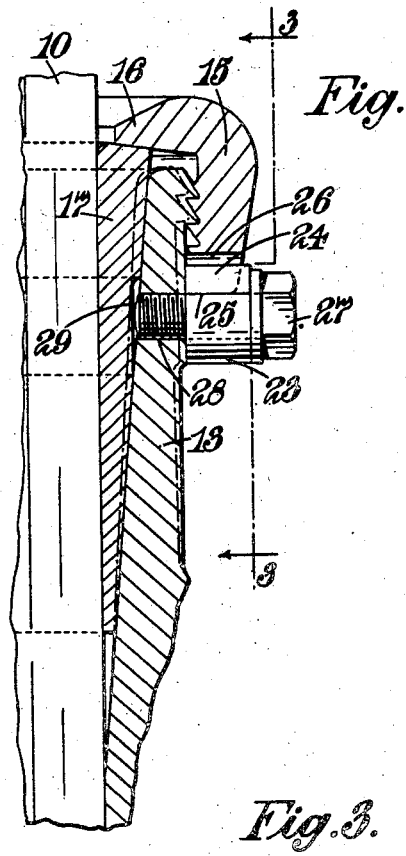
Figure 2 is a similar view, to an enlarged scale, of the outer end of the reinforcing sleeve.
Figure 3:
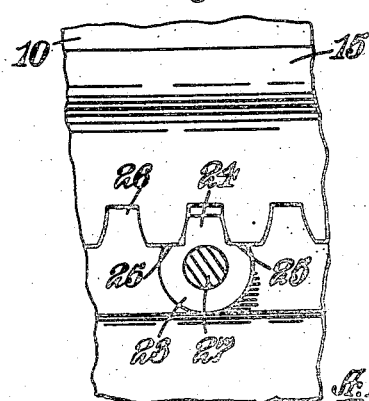
Figure 3 is an elevation on the line 3—3 of Figure 2.

The shape of the bush 17 is shown more clearly in Figure 2. Its internal face is cylindrical and parallel with the plain portion of the blade-root. Its outer surface is of generally conical form so that, as seen in Figure 2, the bush is wedged-shaped, having an angle of taper of about 6°. The internal surface of the surrounding socket member 13 is of similar conical shape but has an angle of taper, when in its unstressed condition, of somewhat less, say about 5°.

When the parts are to be assembled, the nut 15 is passed along the blade from the root end and is followed by the bush 17. The blade-root is now screwed into the sleeve 12 until it assumes the position shown in Figure 1. The bush 17 is now pressed down into the socket member 13 of the sleeve, the nut 15 is engaged with the threads 14 and tightened. As the nut is tightened its flange 16 engages the outer end of the bush and forces the bush down between the blade 10 and the socket member 13. The result of this operation is that the socket member 13 is plastically expanded until the bush makes contact with the sleeve at both its upper and lower ends. Owing to the difference in the angle of taper between the external surface of the bush and the internal surface of the socket member, the sleeve will be expanded to a greater extent at its outer end than at its inner end. In Figure 2 the chain lines show the socket member 13 in the position it occupies prior to tightening the nut 15 and the full lines show it in its expanded condition.

Owing to the small angle of taper of the bush, the friction between the bush and the socket member and between the bush and the blade retains the bush in the position shown in Figure 2, so that it is impossible to withdraw the bush except by the special method hereinafter described. The bush 17 may be formed of a suitably reinforced phenol-formaldehyde condensation product such as that sold under the registered trade-mark "Bakelite". Alternatively, especially where the blade is of an alluminium alloy, the bush could be of a metal such as aluminium. The pressure between the sleeve and the bush and between the bush and the blade may be of the order of from 2000 to 4000 pounds per square inch.

The nut 15 is locked by means of a washer 23 having a tooth 24 and flats 25 to engage serrations 26 on the longitudinally-extending part of the nut. The washer 23 is held on the sleeve 12 by means of a stud 27 screw-threaded into a hole 28 in the socket member.

To remove the blade 10 from the sleeve 12 the stud 27 is removed and the nut 15 unscrewed. The nipple of a grease gun is now screwed into the hole 28 and grease is pumped in under high pressure. Owing to the greater pressure between the blade, bush and socket member at the outer end of the socket member, the grease first works inwardly without escaping from the socket member. The pressure of the grease expands the sleeve 12 away from the bush first at the inner end of the bush and then outwardly towards the outer end of the sleeve, until finally the surfaces are completely parted. The blade may now be easily unscrewed from the sleeve.

To facilitate the entry of the grease between the bush and the socket member 13 the bush may be formed with a parallel portion 29 running round it which thus leaves a cavity between it and the socket member 13.

Although only one of the studs 27 is shown, a plurality of holes 28 could be provided around the socket member 13 to all of which fluid pressure could be applied simultaneously.

Although the primary object of the invention is to eliminate fretting between the air screw blade and the surrounding steel sleeve, it has also the advantage that the sleeve 12 can be removed from the blade whereby the parts may be inspected from time to time.

We claim:

1. An air screw comprising an air screw blade having a root-end, a metal sleeve surrounding the root-end and forming at its outer end a tapering space between it and the root-end, and a tapering bush adapted to be forced into the said space, wherein the taper of the bush is greater than that of the said space and wherein the sleeve is formed between the inner and outer ends of the bush with an orifice through which fluid under pressure may be admitted to expand the sleeve away from the blade-root.

2. In an air screw, an air screw-blade having a root-end, a metal sleeve surrounding the root-end, a tapering bush adapted to be forced into the outer end of the sleeve between the sleeve and the root-end, a nut screw-threaded to the outer end of the sleeve, an inwardly-directed flange carried by the nut to engage the outer end of the bush whereby tightening of the nut forces the bush into the sleeve, external serrations formed on the nut, a stud-like member engaging a screw-threaded hole passing entirely through the said sleeve at a point between the inner and outer ends of the said bush, and a locking device carried by said stud-like member and engaging the said serrations.

3. An air screw blade comprising a root-end, a metal sleeve surrounding the root-end so as to leave a tapering space of about 5° and adapted to be elastically expanded, and a bush having a taper of about 6° and adapted to be forced under pressure into said tapering space, and thereby elastically expand the said sleeve.

4. In an air screw, an air screw blade comprising a root-end, a metal sleeve which surrounds the root-end and has an elastically-expansible outer end and forms at said outer end a tapering space between it and the root-end of the blade, and a bush adapted to be forced into the said space and having an angle of taper greater than that of the said space.

ALFRED HUBERT ROY FEDDEN.
HARRY LAWLEY MILNER.